United States Patent
Lazarini et al.

(10) Patent No.: US 9,981,632 B2
(45) Date of Patent: May 29, 2018

(54) SYSTEMS FOR ELECTRICALLY ISOLATING AN ELECTRONIC MODULE FROM A FRONT WINDSHIELD AND A REAR WINDOW WASHER

(71) Applicant: GM Global Technology Operations LLC, Detroit, MI (US)

(72) Inventors: Marcelo V. Lazarini, Macomb, MI (US); Daniel P. Carlesimo, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 15/221,770

(22) Filed: Jul. 28, 2016

(65) Prior Publication Data

US 2018/0029562 A1     Feb. 1, 2018

(51) Int. Cl.
  *B60S 1/02*  (2006.01)
  *B60R 16/03*  (2006.01)
(52) U.S. Cl.
  CPC ............ *B60S 1/02* (2013.01); *B60R 16/03* (2013.01)
(58) Field of Classification Search
  CPC .................................. B60S 1/02; B60R 16/03
  See application file for complete search history.

(56) References Cited

U.S. PATENT DOCUMENTS

| 2005/0109591 | A1* | 5/2005 | Van Vooren | H01H 23/003 200/1 B |
| 2009/0021919 | A1* | 1/2009 | Gaynier | B60R 16/0239 361/728 |

FOREIGN PATENT DOCUMENTS

| DE | 102005010899 A1 | 9/2006 |
| DE | 102015212065 A1 | 12/2015 |

OTHER PUBLICATIONS

Office Action in corresponding German Application No. 10 2017 116 963.6, dated Mar. 26, 2018.
English Abstract of DE102005010899.
English Abstract of DE102015212065.

* cited by examiner

*Primary Examiner* — Rodney A Butler
(74) *Attorney, Agent, or Firm* — Cynthia R. Parks; Parks IP Law LLC

(57) ABSTRACT

The present technology includes a washer system comprising a washer switch assembly and an electronic module. The washer switch includes a ground configured for electrical connection with a washer pump by way of a switch and a fuse contact configured to receive control signals from a power-mode relay. The electronic module includes a controller comprising a computer-readable storage device, and the controller is electrically isolated from the washer switch assembly and the washer pump in operation of the system.

20 Claims, 4 Drawing Sheets

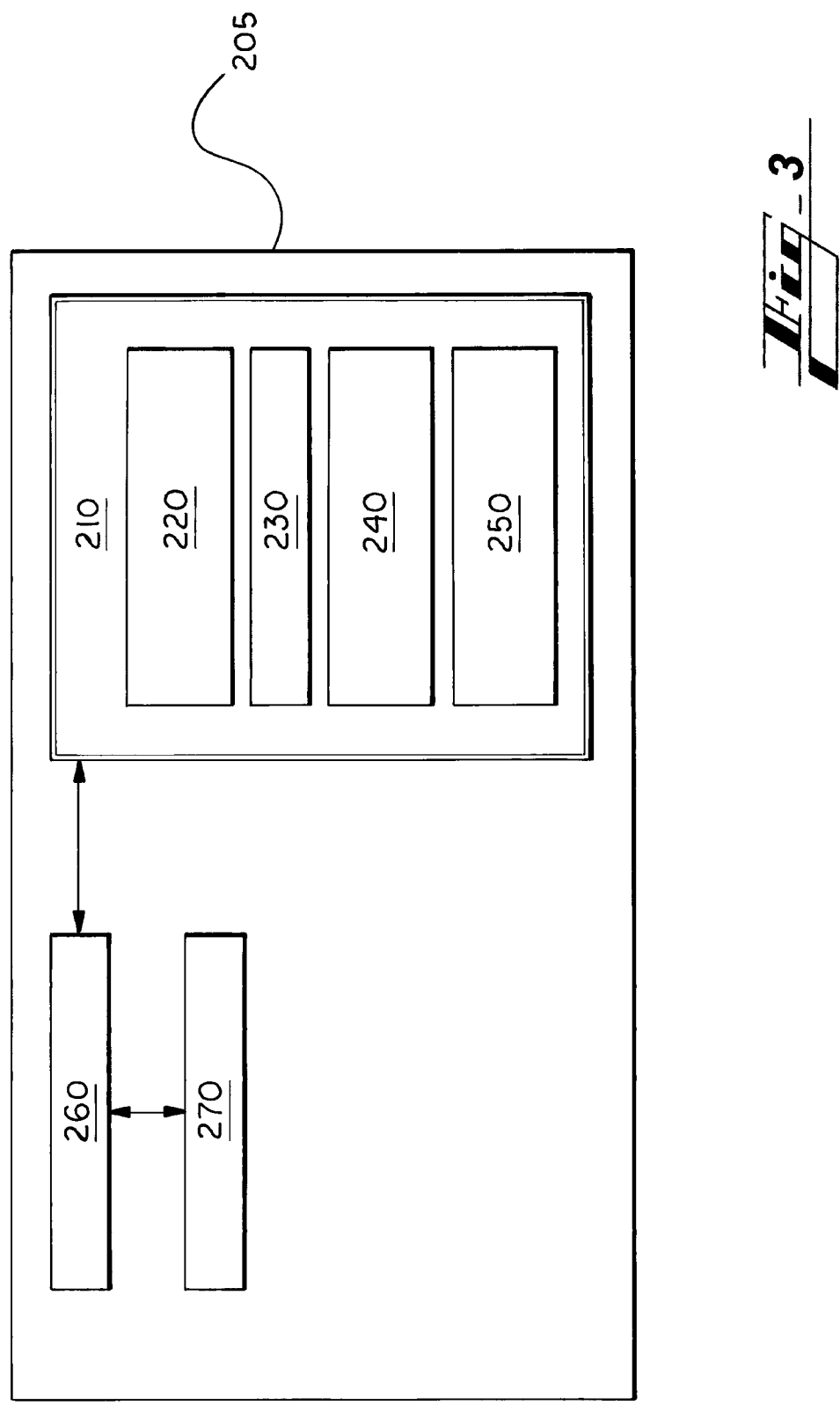

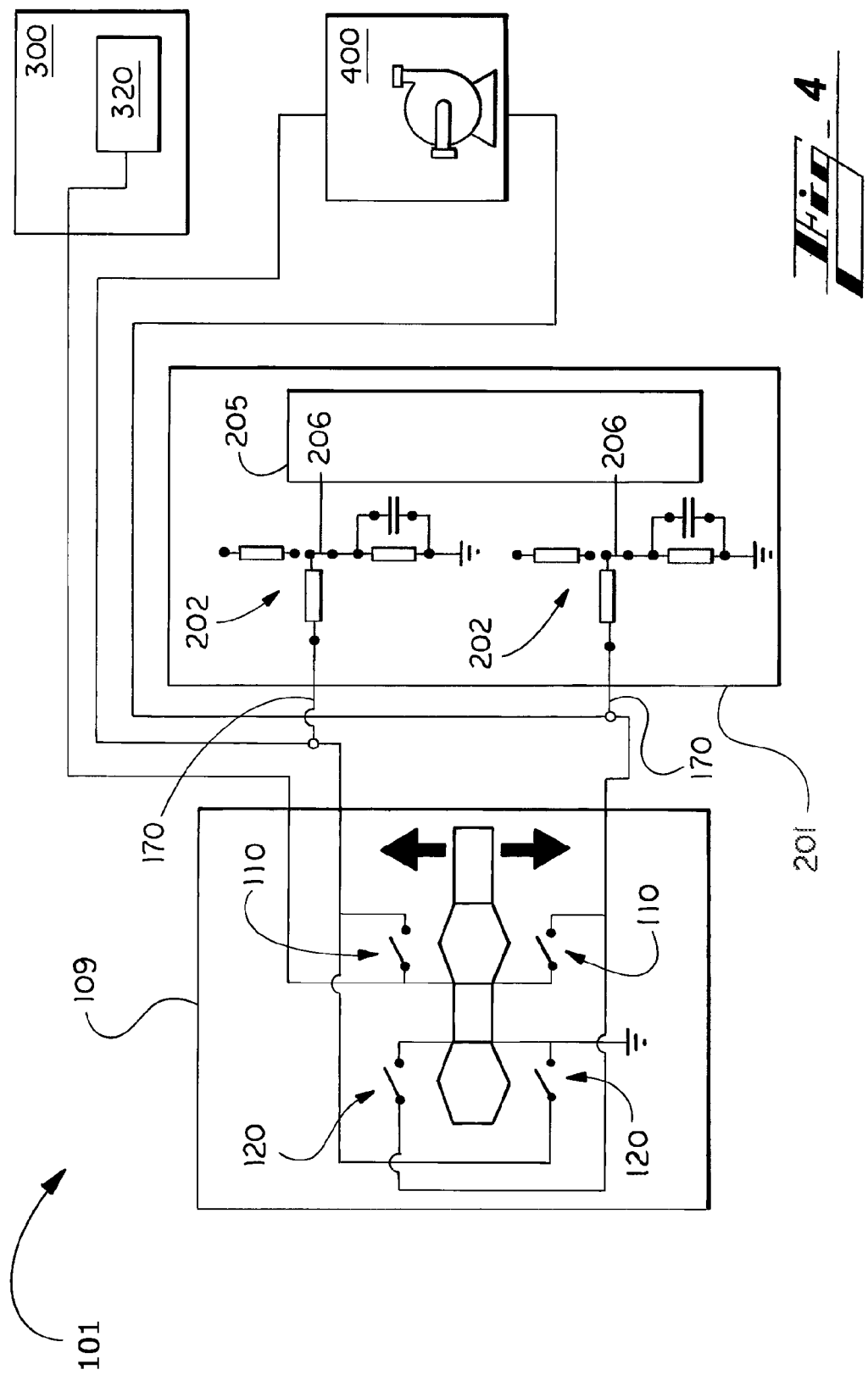
Fig_4

SYSTEMS FOR ELECTRICALLY ISOLATING AN ELECTRONIC MODULE FROM A FRONT WINDSHIELD AND A REAR WINDOW WASHER

TECHNICAL FIELD

The present technology relates to washer systems for front windshields and rear windows. More specifically, the technology includes washer systems arranged to eliminate an input and/or an output from an electronic module.

BACKGROUND

Washer systems have been implemented in many vehicles to operate a front windshield washer and/or a rear window washer. The washer system typically includes a washer switch connected to a single-direction or bidirectional washer pump by way a fuse box.

FIG. 1 illustrates a conventional washer system 10 that is electronically controlled. In operation, dedicated input circuitry within a washer switch 15 communicates, using wiring 17, with an electrical output to a voltage reference 22 (e.g., filters and protective elements) within an electronic module 20. The voltage reference 22 in turn communicates one or more read input signals 26 to a controller 25. The controller 25 interprets the read input signals 26 and communicates one or more relay output signals 27 to one or more transistors 29. The transistors 29 communicate with one or more washer relays 32 within a fuse box 30. For example, in systems using a bidirectional washer pump, a first transistor 29 communicates a first relay output signal 27 to a first washer relay 32 controlling a front windshield washer and a second transistor 29 communicates a second relay output signal 27 to a second washer relay 32 controlling a rear window washer. The first and second washer relays 32 ultimately transmit current (e.g., power 31) to a washer pump 40.

However, conventional washer systems have a number of drawbacks. One issue is that conventional systems duplicate components (e.g., the washer relays 32 at the fuse box 30) especially where a bidirectional pump is present. Duplicate components increases labor and material cost associated with making the washer system. Additionally, duplicate components increases the number of parts that may have to be repaired or replaced over time.

Another issue is that the fuse box 30 is electrically connected to the electronic module 20. Thus, if a component within the electronic module 20 fails, an electrical output (e.g., from the transistor 29) is not communicated to the fuse box 30 and ultimately the washer pump 40.

Additionally, conventional washer systems fail to maintain control and interlock where malfunctions are present within the switch 15. Specifically, the switch 15 directly controls the washer pump 40, which prevents the electronic module 20 from detecting and preventing damage to the pump 40.

SUMMARY

Given the aforementioned deficiencies, a need exists for a washer system that electronically isolates an electronic module of the system from a washer pump of the system. The proposed washer system would maintain control and interlock functions of the electronic module where the switch directly controls the washer pump, specifically where the electronic module is hardwired to the washer pump.

In one aspect, the present technology includes a washer system including a washer switch and the electronic module. The washer switch includes a ground configured for electrical connection with a washer pump by way of a switch and a fuse contact configured to receive control signals from a power-mode relay. The electronic module includes a controller having a computer-readable storage device, and the controller is electrically isolated from the washer switch assembly and the washer pump in operation of the system.

In some embodiments, the computer-readable storage device includes instructions that, when executed by a processor, cause the processor to receive and process an input signal from the washer switch assembly based on predetermined logic criteria. In some embodiments, the computer-readable storage device includes instructions that, when executed by a processor, cause the processor to communicate an output signal to the power-mode relay based on predetermined logic criteria. In some embodiments, the output signal includes data instruction for the fuse contact to reduce or eliminate voltage to the washer pump.

In some embodiments, the washer switch assembly further comprises a signal-status contact configured for electrical connection with a resistor. In some embodiments, the resistor comprises a resistor ladder.

In some embodiments, the electronic module is a first electronic module configured to communicate control signals to the power-mode relay and a second electronic module is configured to communicate control signals to the resistor. In some embodiments, the second electronic module is in communication with the first electronic module.

In some embodiments, the washer switch assembly further comprises an axle in electrical connection which the fuse contact and switching mechanism for the ground.

In another aspect, the present technology includes a washer system comprising a relay box having a power-mode relay, a washer pump, a washer switch and the electronic module. The washer switch includes a ground configured for electrical connection with a washer pump by way of a switch and a fuse contact configured to receive control signals from a power-mode relay. The electronic module includes a controller comprising a computer-readable storage device, and the controller is electrically isolated from the washer switch assembly and the washer pump in operation of the system.

Other aspects of the present technology will be in part apparent and in part pointed out hereinafter.

DESCRIPTION OF THE DRAWINGS

FIG. 3 illustrates an exemplary controller of the washer system of FIG. 2.

FIG. 4 illustrates an alternative embodiment of the washer system.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components described herein in connection with one or more functions are to be interpreted to cover embodiments in which a single component performs the function(s).

In some instances, well-known components, systems, materials, or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The present technology is contemplated form implementation in connection with manufacturing components of vehicles, such as automobiles, marine craft and air craft, and non-vehicle apparatus.

Figure 2:
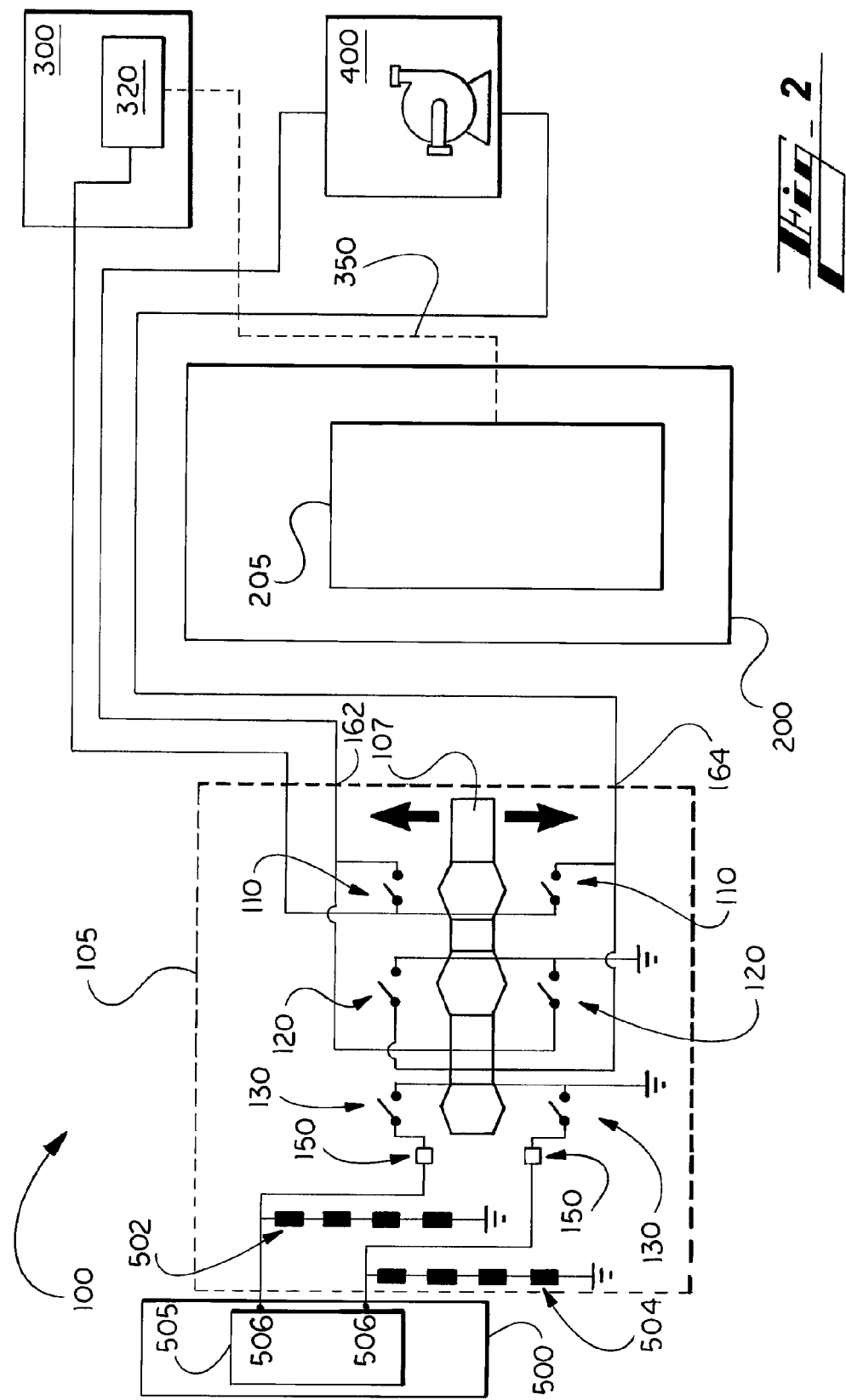
FIG. 2 illustrates an exemplary embodiment of a washer system having electronic modules with monitor capabilities.

FIG. 2 illustrates a washer system 100 that includes a washer switch 105, a first electronic module 200, a relay box 300, a washer pump 400, and a second electronic module 500. The system 100 is configured to perform washing functions where the switch 105 receives signals from the relay box 300 and sends signals to the pump 400 to execute washing functions. The system 100 additionally protects against failure of system components such as the pump 400 when, for example, there is improper operation of the switch 105. Details of the protective function is discussed below.

The pump 400 causes fluid flow to move in either one or two directions. In some embodiments, the pump 400 is a bidirectional pump is operated by the switch 105. The system 100 is discussed below in terms of a bidirectional operation. However, one of skill in the art would recognize that the system 100 can be used in single-direction operation or for operation of multiple switches and washers.

The system 100 may operate using electrical connection between the switch 105 and the electronic modules 200, 500. Unlike conventional systems, the system 100 may alternatively operate without electrical connection between the switch 105 and at least one of the electronic modules 200, 500.

The switch 105 may include a first output pin 162 and a second output pin 164, each configured to receive electrical connections. For example, the output pins 162, 164 electrically connect the pump 400 with the switch 105. As described below in FIG. 4, in some embodiments, each of the output pins 162, 164 are also in electrical connection with an electronic module (e.g., the first electronic module 200) to provide input information (e.g., electrical signals) from the switch 105 to the electronic module 200.

The switch 105 can be arranged in a full-bridge configuration and electrically isolated from the first electronic module 200. In various embodiments, the switch 105 includes an nonconductive axle 107 that electrically connects (i) at least one fuse contact 110, (ii) at least one ground contact 120 (i.e., a switch electrically connected to ground, collectively referred to as ground 120), and (iii) at least one signal-status contact 130 (e.g., a signal conveying a status from a window washer). The contacts 110, 120, 130 are positioned on the axle 107 in parallel with one another.

The axle 107 electrically connects the contacts 110, 120, 130 when moved (e.g., in a backward or forward position).

The electrical connection of the fuse contact 110 and the ground 120 results in a single direction or bidirectional command to the axle 107. In operation, at least one fuse contact 110 and one ground 120 is closed to allow current flow thru the pump 400 (e.g., pumping water in one direction to perform washing of the front windshield or pumping water in another direction to perform washing of the rear window). The signal-status contact 130 indicates a direction of travel of the axle 107).

Each fuse contact 110 is in electrical connection with the relay box 300. The relay box 300 includes fuses and relays in electrical connection with various systems within the vehicle. In some embodiments, the fuse contact 110 is electrically hardwired to a power-mode relay 320 of the relay box 300.

The power-mode relay 320 is an existing relay capable designed for electrical connection with loads, such as an HVAC blower (not illustrated) or other high-current loads. The power-mode relay 320, unlike conventional relays, is also configured to send control signals to regulate power (e.g., turn off power) to loads in pre-determined conditions. In some embodiments, the power-mode relay 320 sends a control signal to the switch 105 via the fuse contact 110 to regulate power to the pump 400 (e.g., to prevent damage). Control signals from the power-mode relay 320 to the switch 105 may occur when a malfunction is detected within the switch 105 (e.g., the switch 105 is sending too much voltage). As a result, the power-mode relay 320 sends a control signal to the switch 105 that reduces or stops the amount of voltage the switch 105 is sending to the pump 400.

In some embodiments, the switch 105 includes one or more resistive elements 150 positioned to allow diagnostic capability (e.g., instant short-to-ground) by an electronic module such as the second electronic module 500. In some embodiments, the resistive elements 150 do not function to differentiate a signal communicated by the signal-status contact 130 from a ground signal generated from a short-to-ground scenario (e.g. damaged wiring harness). Where the resistive elements 150 are present, the electronic module in connection with the resistive elements 150 (e.g., the second electronic module 500 as illustrated in FIG. 2) recognizes that a ground-voltage signal indicates a fault condition because the signal-status contact 130 suffers a voltage drop when passing thru resistive elements 150. However, where resistive elements 150 are not present, a time-based short-to-ground diagnostic capability can be supported. In these embodiments, short-to-ground diagnostics could be detected by the electronic module that reads inputs and monitors input/output diagnostics (e.g., second electronic module 500 as illustrated in FIG. 2).

The first electronic module 200 is electrically isolated from the switch 105 and the pump 400, as illustrated in FIG. 2. Electrical isolation of the electronic module 200 is beneficial for situations where the first electronic module 200 disengages the power-mode relay 320, preventing damage to the pump 400. With this configuration, the electronic module 200 can eliminate the need for dedicated input circuitry (e.g., wiring 17 and voltage reference 22 illustrated in FIG. 1) and associated hardware. The input circuitry and hardware can be eliminated because electrical monitoring is not needed between the switch 105 and the first electronic module 200.

The first electronic module 200 is responsible for operation of the power-mode relay 320. The first electronic module 200 is retrofitted with software that allows the first electronic module 200 to send control signals to disengage (or activate) the power-mode relay 320 where logic criteria are met. For example, the logic criteria may be configured to disengage the power-mode relay 320 to ensure protection of the pump 400 when the switch 105 malfunctions.

The switch 105 includes one or more resistor ladders (e.g., front resistor ladder 502 and rear resistor ladder 504). The resistor ladders 502, 504 are electrically isolated from components within the switch 105. The second electronic module 500 is responsible for operation of the resistor ladders 502, 504. The second module 500 monitors and controls, for example, washer signals transmitted from the signal-status contacts 130. In one embodiment, the resistor ladders 502, 504 infer the second electronic module 500 shares inputs and other functionalities (e.g. wiper related input signals), effectively eliminating the need for dedicated input circuitry and associated hardware.

Figure 1:
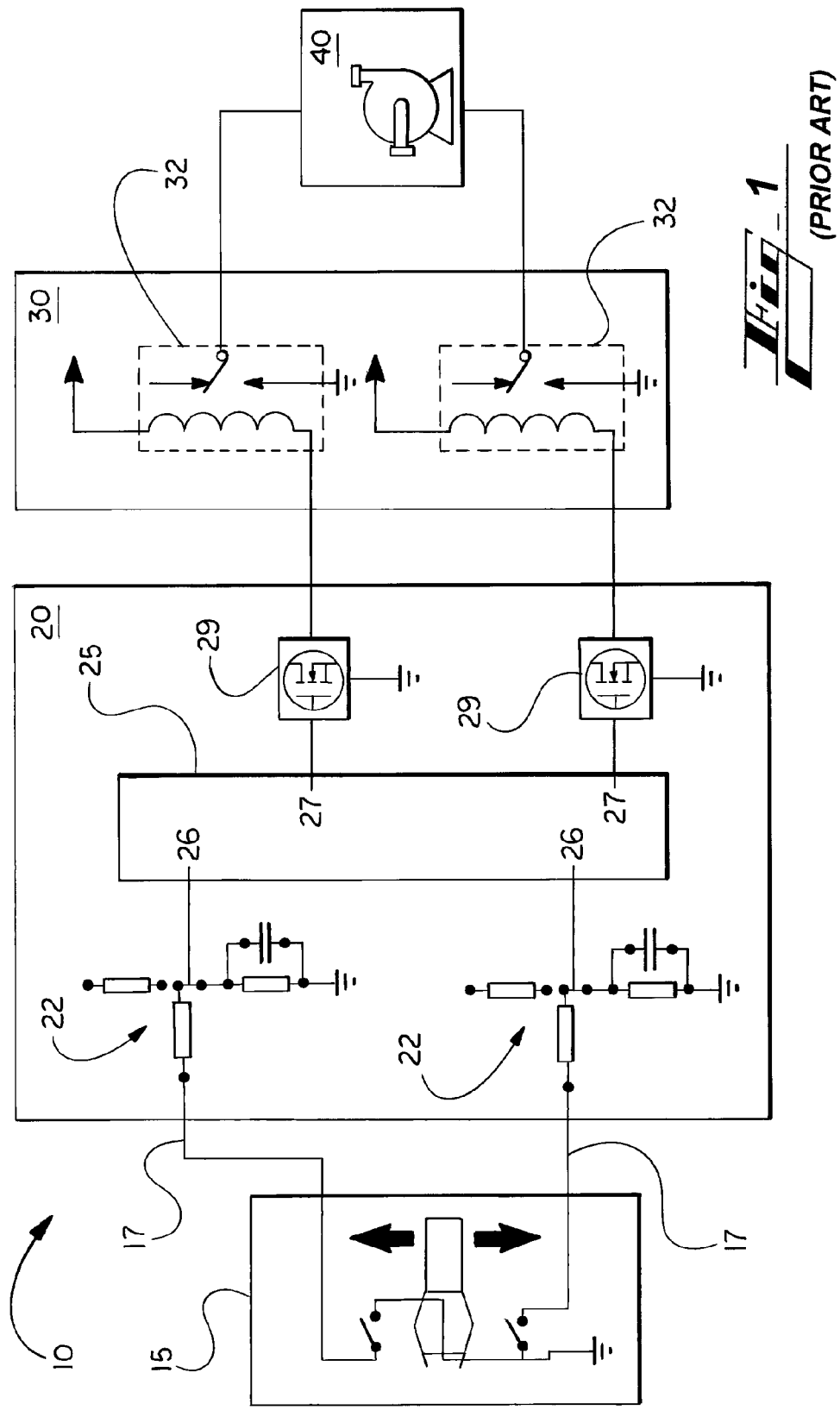
FIG. 1 illustrates a components of a conventional washer system.

The signal-status contacts 130 can eliminate the need for components such as conventional relays (e.g., relay out signal 27 illustrated in FIG. 1), transistors (e.g., transistor 29 illustrated in FIG. 1), and associated wiring, such as leads that provide electrical output (e.g., to the washer relay 32 illustrated in FIG. 1). The resulting system 100 is simpler, more robust, and less expensive to make and maintain.

In one embodiment, one of the signal-status contacts 130 may share the front resistor ladder 502 with other inputs, for example; the front wiper or other (e.g., speed settings of front wiper). Similarly, another of the signal-status contacts 130 may share the rear resistor ladder 504 with other inputs which could be, for example, related to functionality of the rear wiper.

The second electronic module 500 is configured to read output information (e.g., electrical signals) from the resistor ladders 502, 504 to determine an appropriate response. An appropriate response can be any number of outputs such as transmission of an electrical signal to the relay box 300. For example, where the second electronic module 500 detects a malfunction in the switch 105, an appropriate response is for the second electronic module 500 to communicate the malfunction to the first electronic module 200, which in turn engages the power-mode relay 320 to send a control signal to the switch 105, thus preventing damage to the pump 400. This control and interlock functions are not possible in conventional hardwired systems where the switch directly controls the pump.

The second electronic module 500 can include a controller 505 having one or more inputs 506 to control functionality of the switch 105 or other components of the system 100. The second electronic module 500 is used to differentiate the signal-status contact 130 from other signals transmitted (e.g., multiplexed) through the inputs 506 to one or more resistor ladders (e.g., ladders 502, 504).

In some embodiments, the electronic modules 200, 500 may communicate with one another (e.g., over a CAN network). The electronic modules may communicate protocols or other logic criteria over a network. For example, criteria that prompt the power-mode relay 320 to send a control signal to the switch 105 are housed by one electronic module (e.g., the second module 500) and communicated to another module (e.g., the first module) over a CAN network.

In some embodiments, the first electronic module 200 and second electronic module 500 are combined into a single electronic module. A single electronic module, may be desired for example, where the first electronic module 200 (i) has the capability to read signals to and from the resistor ladders 502, 504 and/or (ii) there is a benefit to allocate the ladder readings to one module (e.g., to minimize wiring length between components of the system 100). In these embodiments, the single electronic module reads input from the resistor ladders 502, 504, processes the logic criteria to determine appropriate action, and activates the power-mode relay when the logic criteria are met.

The electronic modules 200, 500 each includes a controller 205, 505 that may store (e.g., to a memory) and execute (e.g., using a processor) instructions directly to the power-mode relay 320 in the case of the first electronic module 200 or to the resistor ladders 502, 504 in the case of the second electronic module 500. In some embodiments, the system 100 includes wiring 350 connecting the controller 205 and the power-mode relay 320 for this purpose. The wiring 350 can include a wiring connection, in a conventional arrangement, to the power-mode relay 320. The first electronic module 200 may activate or disengage the power-mode relay 320 using the wiring 350 where, for example, the second electronic module 500 detects a malfunction in the switch 105.

FIG. 3 illustrates an exemplary embodiment of the controller 205 of FIG. 2 in more detail. The controller 505 may have similar components as the controller 205 described below. In embodiments where only a single electronic module is present, the single electronic module may have similar components as the controller 205 described below.

The controller 205 is in various embodiments an adjustable hardware device developed through the use of code libraries, static analysis tools, software, hardware, firmware, or the like. The controller 205 includes a memory 210. The memory 210 may include several categories, or modules, of software and data used in the controller 205, including, applications 220, a database 230, an operating system (OS) 240, and I/O device drivers 250.

The OS 240 can include any operating system for use with a data processing system. The I/O device drivers 250 may include various routines accessed through the OS 240 by the applications 220 to communicate with devices and certain memory components.

The applications 220 can be stored in the memory 210 and/or in a firmware (not shown in detail) as executable instructions and can be executed by a processor 260. The applications 220 include various programs and software logic that, when executed by the processor 260, process data received by the system 100. The applications 220 may be applied to data stored in the database 230, along with data, e.g., received via the I/O data ports 270. The database 230 represents the static and dynamic data used by the applications 220, the OS 240, the I/O device drivers 250 and other software programs that may reside in the memory 210.

The processor 260 could be multiple processors, which could include distributed processors or parallel processors in a single machine or multiple machines. The processor 260 can be used in supporting a virtual processing environment. The processor 260 may be a microcontroller, microprocessor, application specific integrated circuit (ASIC), programmable logic controller (PLC), complex programmable logic device (CPLD), programmable gate array (PGA) including a Field PGA, or the like. References herein to processor executing code or instructions to perform operations, acts, tasks, functions, steps, or the like, could include the processor 260 performing the operations directly and/or facilitating, directing, or cooperating with another device or component to perform the operations.

While the memory 210 is illustrated as residing proximate the processor 260, it should be understood that at least a portion of the memory 210 can be a remotely accessed storage system, for example, a server on a communication network, a remote hard disk drive, a removable storage medium, combinations thereof, and the like. Thus, any of the data, applications, and/or software described above can be stored within the memory 210 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure can also be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations including single-processor or multiprocessor systems, minicomputers, mainframe computers, personal computers, hand-held computing devices, microprocessor-based, programmable consumer electronics, combinations thereof, and the like.

FIG. 4 illustrates an alternative washer system 101. The system 101 of FIG. 4 includes a washer switch 109, an electronic module 201, and the relay box 300 and pump 400. Unlike system 100, the configuration of the alternative system 101 includes dedicated circuits to read the switch 109.

The switch 109 is similar to switch 105, in that the switch 109 the configured to pass high current (e.g., through a wire) to the pump 400. The switch 109 is a full-bridge configuration that electrically connects (i) at least one fuse contact 110 and (ii) at least one ground 120. However the switch 109 does not include signal-status contacts 130, resistive elements 150, or resistor ladders 502, 504. As illustrated, absence of the resistor ladders 502, 504 eliminates the need of the second electronic module 500.

The ground 120 is electrically connected (e.g., using wiring 170) to pass an electrical signal to a voltage reference 202 such as a voltage at a common collector (VCC) within the electronic module 201. It should be noted that the term VCC without the presence of transistors (e.g., transistor 29 illustrated in FIG. 1) represents a positive voltage.

The electronic module 201 includes the controller 205, which receives read input signals 206 (e.g., using hard-wired connections). However, the electronic module 201 does not communicate outputs (e.g., relay output signal 27 illustrated in FIG. 1) to the relay box 300 or the pump 400 as in conventional configurations. Similar to the first electronic module 200, the electronic module 201 is retrofitted with software that allows the electronic module 201 to send control signals to disengage of the power-mode relay 320 to reduce or eliminate voltage sent by the switch 109 to the pump 400.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A washer system comprising:
    a washer switch assembly comprising:
        a ground configured for electrical connection with a washer pump by way of a switch; and
        a fuse contact configured to receive control signals from a power-mode relay; and
    an electronic module including a controller comprising a computer-readable storage device, the controller electrically isolated from the washer switch assembly and the washer pump in operation of the system.

2. The system of claim 1, wherein the computer-readable storage device comprises instructions that, when executed by a processor, cause the processor to receive and process an input signal from the washer switch assembly based on predetermined logic criteria.

3. The system of claim 1, wherein the computer-readable storage device comprises instructions that, when executed by a processor, cause the processor to communicate an output signal to the power-mode relay based on predetermined logic criteria.

4. The system of claim 3, wherein the output signal includes data instruction for the fuse contact to reduce or eliminate voltage to the washer pump.

5. The system of claim 1, wherein the washer switch assembly further comprises a signal-status contact configured for electrical connection with a resistor.

6. The system of claim 5, wherein the resistor comprises a resistor ladder.

7. The system of claim 5, wherein the electronic module is a first electronic module configured to communicate control signals to the power-mode relay and a second electronic module is configured to communicate controls signals to the resistor.

8. The system of claim 7, wherein the second electronic module is in communication with the first electronic module.

9. The system of claim 1, wherein the washer switch assembly further comprises an axle in electrical connection which the fuse contact and switching mechanism for the ground.

10. A washer system comprising:
    a relay box having a power-mode relay;
    a washer pump;
    a washer switch assembly comprising:
        a ground configured for electrical connection with the washer pump by way of a switch; and
        a fuse contact configured to receive control signals from the power-mode relay; and
    an electronic module including a controller comprising a computer-readable storage device, the controller electrically isolated from the washer switch assembly and the washer pump in operation of the system.

11. The system of claim 10, wherein the computer-readable storage device comprises instructions that, when executed by a processor, cause the processor to receive and process an input signal from the washer switch assembly based on predetermined logic criteria.

12. The system of claim 10, wherein the computer-readable storage device comprises instructions that, when executed by a processor, cause the processor to communicate an output signal to the power-mode relay based on predetermined logic criteria.

13. The system of claim 12, wherein the output signal includes data instruction for the fuse contact to reduce or eliminate voltage to the washer pump.

14. The system of claim 10, wherein the washer switch assembly further comprises a signal-status contact configured for electrical connection with a resistor.

15. The system of claim 14, wherein the resistor comprises a resistor ladder.

16. The system of claim 14, wherein the electronic module is a first electronic module configured to communicate control signals to the power-mode relay and a second electronic module is configured to communicate controls signals to the resistor.

17. The system of claim 16, wherein the second electronic module is in communication with the first electronic module.

18. A washer system comprising:
a washer switch assembly comprising:
a ground configured for electrical connection with a washer pump by way of a switch;
a fuse contact configured to receive control signals from a power-mode relay;
a signal-status contact configured for electrical connection with a resistive ladder;
a resistor configured for electrical connection with the resistive ladder and the signal-status contact; and
an electronic module including a controller comprising a computer-readable storage device, the controller electrically isolated from the washer switch assembly and the washer pump in operation of the system.

19. The system of claim 18, wherein the computer-readable storage device comprises instructions that, when executed by a processor, cause the processor to receive and process an input signal from the washer switch assembly based on predetermined logic criteria.

20. The system of claim 18, wherein the computer-readable storage device comprises instructions that, when executed by a processor, cause the processor to communicate an output signal to the power-mode relay based on predetermined logic criteria.

* * * * *